(12) United States Patent
Imai

(10) Patent No.: US 9,780,693 B2
(45) Date of Patent: Oct. 3, 2017

(54) RESONANT INVERTER AND RESONANCE POWER SUPPLY APPARATUS

(71) Applicant: TDK CORPORATION, Tokyo (JP)

(72) Inventor: Katsunori Imai, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 15/042,788

(22) Filed: Feb. 12, 2016

(65) Prior Publication Data

US 2016/0241163 A1 Aug. 18, 2016

(30) Foreign Application Priority Data

Feb. 16, 2015 (JP) .................................. 2015-027364

(51) Int. Cl.
| | |
|---|---|
| *H02M 7/537* | (2006.01) |
| *H02M 7/5381* | (2007.01) |
| *H02M 3/158* | (2006.01) |
| *H02M 3/335* | (2006.01) |
| *H02M 7/48* | (2007.01) |
| *H02M 1/00* | (2006.01) |

(52) U.S. Cl.
CPC ......... *H02M 7/537* (2013.01); *H02M 3/1588* (2013.01); *H02M 3/335* (2013.01); *H02M 7/5381* (2013.01); *H02M 2001/0058* (2013.01); *H02M 2007/4815* (2013.01); *Y02B 70/1441* (2013.01)

(58) Field of Classification Search
CPC ......... H02M 2001/0058; H02M 3/335; H02M 3/1588; H02M 7/5381; H02M 7/537
USPC .......................................... 363/21.02, 24, 25
See application file for complete search history.

(56) References Cited

U.S. PATENT DOCUMENTS

| | | | |
|---|---|---|---|
| 7,889,519 B2 | 2/2011 | Perreault et al. | |
| 7,924,580 B2 * | 4/2011 | Glaser ................. | H02M 3/1588 363/24 |
| 2014/0104893 A1* | 4/2014 | Pan ....................... | H02M 3/337 363/21.02 |

* cited by examiner

*Primary Examiner* — Fred E Finch, III
*Assistant Examiner* — Jye-June Lee
(74) *Attorney, Agent, or Firm* — Oliff PLC

(57) ABSTRACT

A resonant inverter includes first and second switches, first and second capacitive elements, a first coil, a second coil, a third coil, and a third capacitive element. The first and second switches are alternately turned on and off. The first and second capacitive elements are connected in parallel to the first switch and the second switch, respectively. The first coil is disposed between the first switch and an input voltage terminal. The second coil is disposed between the second switch and the input voltage terminal. The third coil and a third capacitive element are connected in series to each other and connected in parallel to a series circuit of the first and second coils. The first and second capacitive elements and the first and second coils constitute a plurality of first resonant circuits. The third coil and the third capacitive element constitute a single second resonant circuit.

4 Claims, 7 Drawing Sheets

DRIVING FREQUENCY

RESONANT INVERTER AND RESONANCE POWER SUPPLY APPARATUS

BACKGROUND OF THE INVENTION

1. Field of the Invention

The present invention relates to a resonant inverter and resonance power supply apparatus capable of easily reducing an operating voltage of a main switch.

2. Description of the Related Art

U.S. Pat. No. 7,924,580 discloses a push-pull resonant inverter having a plurality of resonant frequencies and capable of driving switches with a phase difference of 180°. The inverter disclosed in this patent literature is a push-pull inverter having resonance such that two single-ended EF2 inverter sections coupled together with a shared ground are coupled to at least one load. This patent literature also discloses the use of coupling that enables high frequencies in the push-pull sections to be independently tuned. A configuration is also disclosed in which a resonant frequency of a first harmonic resonator and a second harmonic resonator in a section 1 and a resonant frequency of a first harmonic resonator and a second harmonic resonator in a section 2 are individually controlled and some of resonant elements in the second harmonic resonator in each section is shared. A result of the configuration is also disclosed in which an impedance seen by the switching element in each section is the same as an impedance seen by the single-ended switching element and the waveform in the switch in each section is the same as the waveform in the single-ended switch. The necessity of a low impedance at the second harmonic of the driving frequency in a class EF2 operation and production of that impedance by the second harmonic resonator in each section are disclosed.

The disclosed push-pull inverter includes two single-ended inverters coupled together and allows the use of electric power simply twice that in a single-ended inverter. Generally, for high-frequency inverters, driving high-side switches, such as bridge circuits, at high frequencies needs to ensure a short dead time, and this is difficult in terms of prevention of flow-through currents in the high-side and low-side switches. In contrast, for the disclosed push-pull inverter, because only a low-side switch is driven, it is an effective approach to extending an electric power range of an inverter driven at high frequencies.

However, the known push-pull resonant inverter disclosed in the above-mentioned patent literature needs to adjust a resonant frequency in the second harmonic resonator for each inverter section. If the resonant frequency in each section is displaced, waveforms in the sections may become imbalanced, a transformer may be saturated or an operating voltage of the switches may increase, and this may adversely affect the life of the switches. Although the above-mentioned patent literature discloses setting the resonant frequency in the second harmonic resonator at a value twice the oscillation frequency, setting the resonant frequency in the second harmonic resonator at the value twice the oscillation frequency does not necessarily lead to minimization of the operating voltage in the switches, and in consideration of variations or other factors, it may even have an adverse effect on the life of the switches.

SUMMARY OF THE INVENTION

In light of the above-described issues in related art, it is an object of the present invention to provide a resonant inverter and resonance power supply apparatus that remove a waveform imbalance between switches in sections, reduce an operating voltage in the switches, thus do not adversely affect the life of the switches, and is capable of reducing the entire size and cost.

To solve the above issues, a resonant inverter according to an aspect of the present invention includes first and second switches, first and second capacitive elements, a first coil, a second coil, a third coil, and a third capacitive element. The first and second switches are alternately turned on and off. The first and second capacitive elements are connected in parallel to the first switch and the second switch, respectively. The first coil is disposed between the first switch and an input voltage terminal. The second coil is disposed between the second switch and the input voltage terminal. The third coil and a third capacitive element are connected in series to each other and connected in parallel to a series circuit of the first and second coils. The first and second capacitive elements and the first and second coils constitute a plurality of first resonant circuits. The third coil and the third capacitive element constitute a single second resonant circuit.

Thus, the resonant circuit can have a simplified configuration, and the resonant inverter capable of reducing its size and cost can be provided. In addition, because the number of capacitive elements constituting the resonant circuit can be reduced, setting the resonant frequency can be simplified, and a waveform imbalance in the switches is removed. Accordingly, the resonant inverter capable of reducing the operating voltage in the switches and not adversely affecting the life of the switches can be provided.

In the resonant inverter according to the aspect of the present invention, the second resonant circuit may have a resonant frequency larger than twice and smaller than or equal to 2.75 times a driving frequency at which the first and second switches are driven. Thus, the resonant inverter with a reduced operating voltage in the switches can be provided.

A resonance power supply apparatus according to another aspect of the present invention includes a resonant inverter and a resonant rectifier connected to the resonant inverter. Thus, because the rectifier is also of the resonance type, the resonance power supply apparatus contributing to its size reduction can be provided.

Accordingly, the present invention can provide a resonant inverter that removes a waveform imbalance between switches in sections, reduces an operating voltage in the switches, thus does not adversely affect the life of the switches, and is capable of reducing the its size and cost.

DESCRIPTION OF THE PREFERRED EMBODIMENTS

Figure 1:
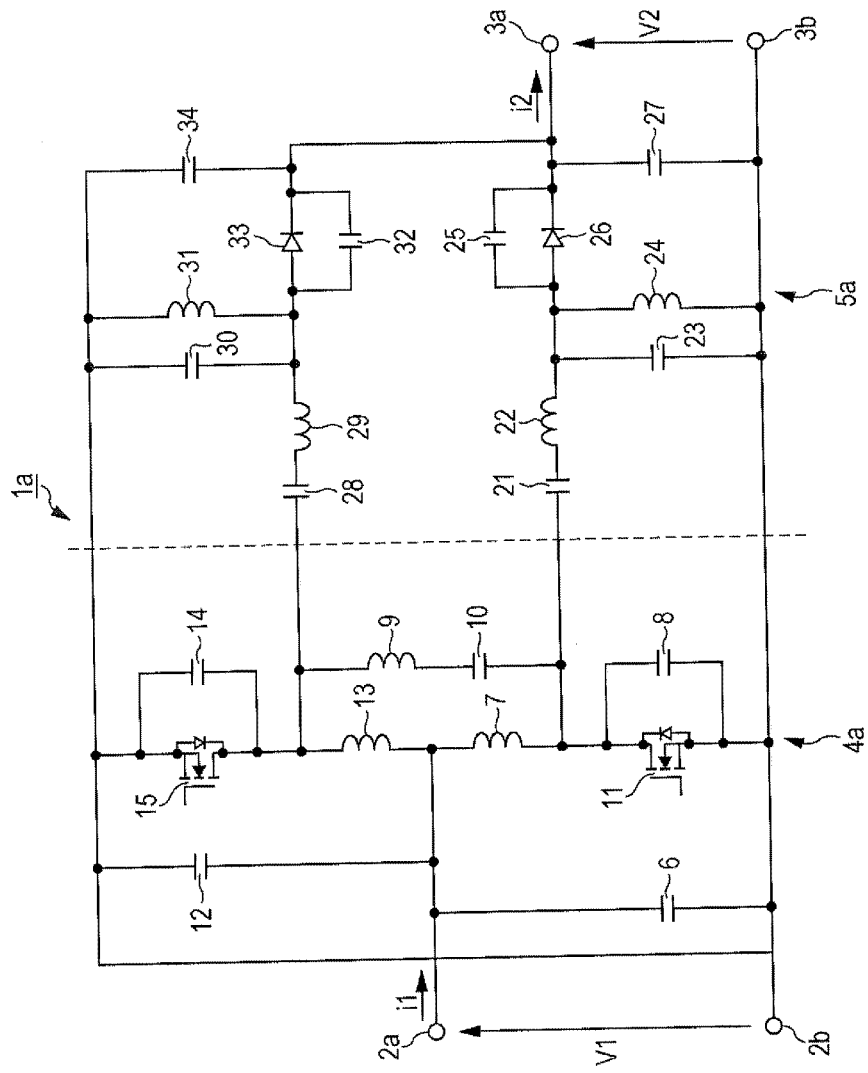
FIG. 1 illustrates a resonant inverter circuit in which a third coil and a third capacitor are shared by inverter sections according to a first embodiment of the present invention.

Preferred embodiments of the present invention are described below. The subject of the present invention is not limited to the embodiments below. Components described below include components easily estimated by those skilled in the art, substantially the same components, and any combinations thereof.

The embodiments of the invention are described below with reference to the drawings. In the description of the drawings, the same elements have the same reference numerals, and the description about them is not repeated.

First Embodiment

FIG. 1 is a circuit diagram that illustrates a configuration of a resonant converter 1a (resonance power supply apparatus) according to an embodiment of the present invention. The resonant converter 1a illustrated in FIG. 1 includes a pair of input terminals 2a and 2b (hereinafter also referred to as input terminal 2 unless specified otherwise), output terminals 3a and 3b (hereinafter also referred to as output terminal 3 unless specified otherwise), a resonant inverter 4a, and a resonant rectifier 5a. The resonant converter 1a converts an input voltage (direct current voltage) V1 input to the input terminal 2 into an output voltage (direct current voltage) V2 and outputs it from the output terminal 3. The resonant converter 1a receives the input voltage V1 and input current i1 at the input terminal 2 and outputs the operating voltage V2 and load current i2 from the output terminal 3.

The resonant inverter 4a includes a single switch and a single input capacitor in each of inverter sections. The switches are a switch 11 (first switch) and a switch 15 (second switch). The input capacitors are an input capacitor 6 (first capacitive element) and an input capacitor 12 (second capacitive element). The resonant inverter 4a includes a first resonant coil 7, a second resonant coil 13, a first resonant capacitor 8, and a second resonant capacitor 14. The resonant inverter 4a includes a third resonant coil 9 and a third resonant capacitor 10 shared by the inverter sections. One example of the resonant converter 1a may be of the resonant buck converter circuit type and convert the input voltage V1 received through the input terminal 2 into an alternating current voltage.

The inverter sections referred to here are a first inverter section including at least the input capacitor 6, switch 11, first resonant capacitor 8, and first resonant coil 7 and a second inverter section including at least the input capacitor 12, switch 15, second resonant capacitor 14, and second resonant coil 13.

The input terminal 2a is connected to a first end of the input capacitor 6 and a first of the first resonant coil 7. A second end of the first resonant coil 7 is connected to a drain of the switch 11 and a first end of the first resonant capacitor 8. A source of the switch 11 is connected to a second end of the first resonant capacitor 8, a second end of the input capacitor 6, and the input terminal 2b. That is, the switch 11 and first resonant capacitor 8 are connected in parallel. The switch 11 includes a body diode whose cathode is connected to the drain of the switch 11 and anode is connected to the source of the switch 11. A gate of the switch 11 is connected to a control circuit (not illustrated). The first inverter section is configured as described above.

The input terminal 2a is connected to a first end of the input capacitor 12 and a first end of the second resonant coil 13. A second end of the second resonant coil 13 is connected to a drain of the switch 15 and a first end of the second resonant capacitor 14. A source of the switch 15 is connected to a second end of the second resonant capacitor 14, a second end of the input capacitor 12, and the input terminal 2b. That is, the switch 15 and second resonant capacitor 14 are connected in parallel. The switch 15 includes a body diode whose cathode is connected to the drain of the switch 15 and anode is connected to the source of the switch 15. A gate of the switch 15 is connected to a control circuit (not illustrated). The second inverter section is configured as described above.

The first resonant coil 7 and first resonant capacitor 8 constitute a resonant circuit. The second resonant coil 13 and second resonant capacitor 14 constitute a resonant circuit. These resonant circuits are a plurality of first resonant circuits.

A first end of the third resonant coil 9 and a first end of the third resonant capacitor 10 (third capacitive element) are connected in series. A second end of the third resonant coil 9 is connected to the second end of the second resonant coil 13, the drain of the switch 15, and the first end of the second resonant capacitor 14. A second end of the third resonant capacitor 10 is connected to the second end of the first resonant coil 7, the drain of the switch 11, and the first end of the first resonant capacitor 8. The third resonant coil 9 and third resonant capacitor 10 constitute a second resonant circuit.

Each of the switches 11 and 15 includes a reverse conduction diode in the direction from the input terminal 2b to the input terminal 2a and a capacitance between the terminals 2b and 2a. The capacitances between the terminals are considered to be included in the first resonant capacitors 8 and 14, respectively.

The resonant rectifier 5a includes two inverter sections including rectifier diodes 26 and 33, output capacitors 27 and 34, resonant coils 22 and 29, resonant capacitors 23 and 30, resonant coils 24 and 31, and resonant capacitors 25 and 32, respectively. The resonant capacitors 25 and 32 include junction capacitances of the rectifier diodes 26 and 33, respectively. The resonant rectifier 5a receives an alternating current voltage produced by the resonant inverter 4a, converts it into the output voltage V2, and outputs it to the output terminal 3. The use of the resonance type as the rectifier connected to the resonant inverter 4a can reduce the entire size of the resonance power supply apparatus.

In the first embodiment, because the third resonant coil 9 and third resonant capacitor 10, which constitute the second resonant circuit, are disposed between the inverter sections, unlike known resonant inverters, the second resonant frequency has to be adjusted in only one location. Setting a low impedance low at a frequency twice the driving frequency is not necessarily equivalent to a condition that the operating voltage of the main switches is the minimum. To reduce the operating voltage in the switches 11 and 15, the resonant capacitors 8 and 14 and the resonant coils 7 and 13 may be set such that the resonant frequency corresponding to the lowest point of the impedance in the resonant inverter 4a may be set at a value larger than twice and smaller than or equal to 2.75 times the driving frequency using the third resonant capacitor 10 and third resonant coil 9 and such that the impedance is the maximum at the driving frequency and a frequency three times the driving frequency. The details are described below with reference to FIG. 5.

Figure 6:
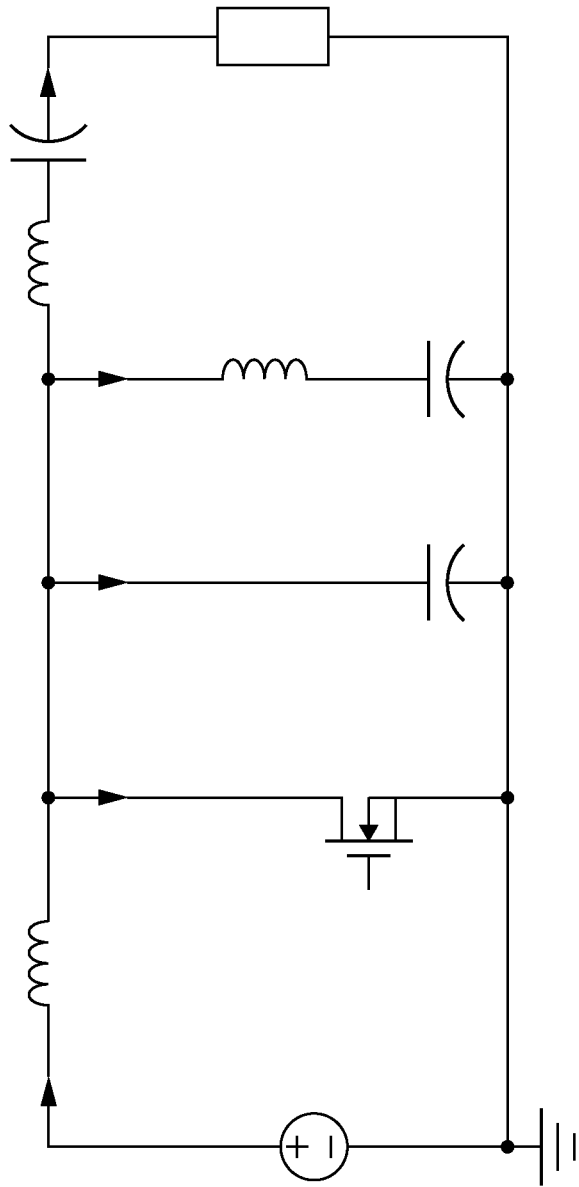
FIG. 6 illustrates an example of a known resonance single-ended inverter.
Figure 7:
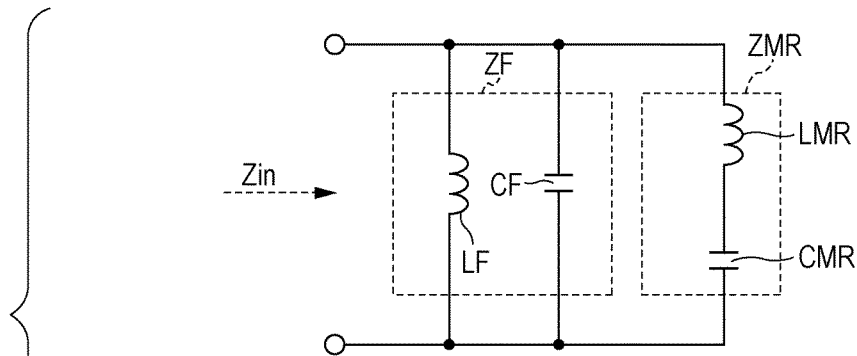
FIG. 7 illustrates impedance characteristics of the known resonant inverter.
Figure 7:
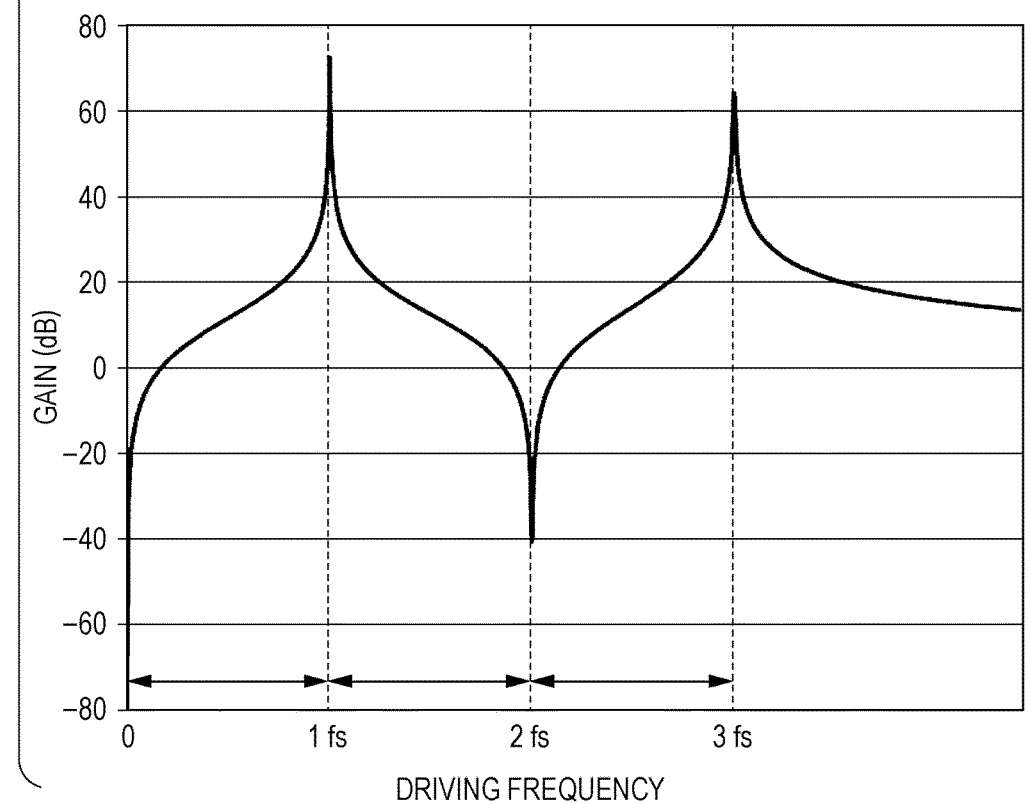

An operating point can be determined as described below. Even a push-pull inverter has the same fundamental configuration as that of a single-ended inverter. This is because the switch 11 and the switch 15 are turned on and off in an alternating manner. Specifically, when the switch 11 is in an off state, the switch 15 is in an on state. Accordingly, the operations of the third resonant coil 9 and third resonant capacitor 10, which define the second resonant frequency, can be considered to be the same as the single-ended case. The impedance in the known resonant inverter illustrated in FIG. 6 is illustrated in FIG. 7. In the case of a push-pull converter, two sections operate in substantially the same way under the same conditions. One section in the first embodiment is discussed here. When the inductance in the first resonant coil 7 is defined as LF, the capacitance of the first resonant capacitor 8 is defined as CF, the parallel impedance based on LF and CF is defined as ZF, the inductance of the third resonant coil 9 is defined as LMR, the capacitance of the third resonant capacitor 10 is defined as CMR, and the series impedance based on LMR and CMR is defined as ZMR, the input impedance Zin can be expressed by the following expression.

$$\frac{1}{Zin} = \frac{1}{Z_F} + \frac{1}{Z_{MR}} \tag{1}$$

The parallel impedance ZF can be expressed by Expressions (2).

$$\frac{1}{Z_F} = \frac{1}{sL_F} + sC_F = \frac{1+s^2 L_F C_F}{sL_F} \tag{2}$$

$$Z_F = \frac{sL_F}{1+s^2 \cdot L_F \cdot C_F}$$

The series impedance ZMR can be expressed by Expression (3).

$$z_{MR} = sL_{MR} + \frac{1}{sC_{MR}} = \frac{1+s^2 \cdot L_{MR} \cdot C_{MR}}{sC_{MR}} \tag{3}$$

Hence, Zin can be changed to Expression (4).

$$\frac{1}{Zin} = \frac{1+s^2 \cdot L_F \cdot C_F}{sL_F} + \frac{sC_{MR}}{1+s^2 \cdot L_{MR} \cdot C_{MR}} \tag{4}$$

When this expression is rearranged and Zin is expressed by using an angular frequency ω, Expression (5) can be obtained.

$$Zin = \frac{i \cdot \omega \cdot L_F \cdot (1-\omega^2 \cdot C_{MR} \cdot L_{MR})}{1-\omega^2 \cdot (L_F \cdot C_F + L_{MR} \cdot C_{MR} + L_F \cdot C_{MR}) + \omega^4 \cdot (L_F \cdot C_F \cdot L_{MR} \cdot C_{MR})} \tag{5}$$

The resonant frequency based on LF and CF is defined as Expression (6).

$$\omega_{FF} = \frac{1}{\sqrt{L_F \cdot C_F}} \tag{6}$$

The resonant frequency based on LMR and CMR is defined as Expression (7).

$$\omega_{MM} = \frac{1}{\sqrt{L_{MR} \cdot C_{MR}}} \tag{7}$$

The resonant frequency based on LF and CMR is defined as Expression (8).

$$\omega_{FM} = \frac{1}{\sqrt{L_F \cdot C_{MR}}} \tag{8}$$

Expression (5) can be changed to Expression (9).

$$Zin = \frac{i \cdot \omega \cdot L_F \cdot \left(1 - \frac{\omega^2}{\omega_{MM}^2}\right)}{1 - \omega^2 \cdot \left(\frac{1}{\omega_{FF}^2} + \frac{1}{\omega_{MM}^2} + \frac{1}{\omega_{FM}^2}\right) + \omega^4 \cdot \left(\frac{1}{\omega_{FF}^2 \cdot \omega_{MM}^2}\right)} \tag{9}$$

A condition that the input impedance tin is the minimum is that the numerator is zero and thus can be expressed by Expression (10).

$$\omega \cdot L_F \cdot \left(1 - \frac{\omega^2}{\omega_{MM}^2}\right) = 0 \tag{10}$$

To set the condition that the input impedance is the minimum at 0 times and 2 times the driving frequency, when the driving frequency is denoted as fs and the angular frequency ωs=2πfs, Expressions (11) can be obtained.

$$\omega = 0 \tag{11}$$
$$\omega = \omega_{MM} = \frac{1}{\sqrt{L_{MR} \cdot C_{MR}}} = 2 \cdot \omega_s$$

Meanwhile, a condition that the input impedance is the maximum is that the denominator is zero and thus can be expressed by Expression (12).

$$1 - \omega^2 \cdot \left(\frac{1}{\omega_{FF}^2} + \frac{1}{\omega_{MM}^2} + \frac{1}{\omega_{FM}^2}\right) + \omega^4 \cdot \left(\frac{1}{\omega_{FF}^2 \cdot \omega_{MM}^2}\right) = 0 \tag{12}$$

To simplify this quartic equation, when α and β are defined as described below, Expressions (13) and (14) can be obtained.

$$\alpha = \left(\frac{\omega_{FF}^2 \cdot \omega_{MM}^2}{2}\right) \cdot \left(\frac{1}{\omega_{FF}^2} + \frac{1}{\omega_{MM}^2} + \frac{1}{\omega_{FM}^2}\right) \quad (13)$$

$$\beta = \frac{2}{\left(\frac{1}{\omega_{FF}^2} + \frac{1}{\omega_{MM}^2} + \frac{1}{\omega_{FM}^2}\right)} \quad (14)$$

Expression (12) can be changed to Expression (15).

$$1 - \omega^2 \cdot \frac{2}{\beta} + \omega^4 \cdot \frac{1}{\alpha\beta} = 0 \quad (15)$$

From Expressions (13) and (14), Expressions (16) and (17) can be obtained.

$$\frac{2}{\beta} = \frac{1}{\omega_{FF}^2} + \frac{1}{\omega_{FM}^2} + \frac{1}{\omega_{MM}^2} \quad (16)$$

$$\frac{1}{\alpha\beta} = \frac{1}{\omega_{FF}^2 \cdot \omega_{MM}^2} \quad (17)$$

The solution of the quartic equation (15) can be written as Expression (18).

$$\omega = \left[\sqrt{\alpha\beta \cdot \left(\frac{1}{\beta} + \frac{\sqrt{\frac{\alpha\beta - \beta^2}{\alpha\beta}}}{\beta}\right)} - \sqrt{\alpha\beta \cdot \left[\frac{1}{\beta} + \frac{1}{\beta} \cdot \sqrt{\frac{1}{\alpha\beta} \cdot (\alpha\beta - \beta^2)}\right]} \sqrt{\alpha\beta \cdot \left(\frac{1}{\beta} + \frac{\sqrt{\frac{\alpha\beta - \beta^2}{\alpha\beta}}}{\beta}\right)} - \sqrt{\alpha\beta \cdot \left[\frac{1}{\beta} - \frac{1}{\beta} \cdot \sqrt{\frac{1}{\alpha\beta} \cdot (\alpha\beta - \beta^2)}\right]}\right] \quad (18)$$

Because ω has a positive value, the first resonant frequency and third resonant frequency at which the input impedance Zin is the maximum can be given by Expressions (19) and (20).

$$\omega_1 = \sqrt{\alpha\left(1 - \sqrt{1 - \frac{\beta}{\alpha}}\right)} \quad (19)$$

$$\omega_3 = \sqrt{\alpha\left(1 + \sqrt{1 - \frac{\beta}{\alpha}}\right)} \quad (20)$$

To set the input impedance Zin such that the first resonant frequency is 1 time and the third resonant frequency is 3 times, they are defined as Expressions (21).

$$\omega_1 = \omega_s \quad (21)$$
$$\omega_3 = 3 \cdot \omega_s$$

$$\omega_s = \sqrt{\alpha\left(1 - \sqrt{1 - \frac{\beta}{\alpha}}\right)} \quad (22)$$

$$3\omega_s = \sqrt{\alpha\left(1 + \sqrt{1 - \frac{\beta}{\alpha}}\right)}$$

When the both sides in Expressions (22) are squared, Expressions (23) can be obtained.

$$\omega_s^2 = \alpha\left(1 - \sqrt{1 - \frac{\beta}{\alpha}}\right) \quad (23)$$

$$9 \cdot \omega_s^2 = \alpha\left(1 + \sqrt{1 - \frac{\beta}{\alpha}}\right)$$

$$\alpha - \omega_s^2 = \alpha\sqrt{1 - \frac{\beta}{\alpha}} \quad (24)$$

$$9 \cdot \omega_s^2 - \alpha = \alpha \cdot \sqrt{1 - \frac{\beta}{\alpha}}$$

The right side of the left expression is equal to the right side of the right expression in Expressions (24). Therefore, when β is eliminated to find α, Expression (25) can be obtained.

$$\alpha = 5 \cdot \omega_s^2 \quad (25)$$

When Expression (25) is substituted into the left expression in (23) to determine β, Expression (26) can be obtained.

$$\beta = \frac{9 \cdot \omega_s^2}{5} \quad (26)$$

When Expressions (26) and (11) are substituted into Expression (14), Expression (27) can be obtained.

$$\frac{9 \cdot \omega_s^2}{5} = \frac{2}{\left[\frac{1}{\omega_{FF}^2} + \frac{1}{(2\omega_s)^2} + \frac{1}{\omega_{FM}^2}\right]} \quad (27)$$

When Expression (27) is solved for $\omega_{FF}^2$, Expression (28) can be obtained.

$$\omega_{FF}^2 = \frac{1}{\frac{1}{\omega_{FM}^2} - \frac{31}{36 \cdot \omega_s^2}} \quad (28)$$

When Expressions (25) and (11) are substituted into Expression (13), Expression (29) can be obtained.

$$5 \cdot \omega_s^2 = \left[\frac{\omega_{FF}^2 \cdot (2\omega_s)^2}{2}\right] \cdot \left[\frac{1}{\omega_{FF}^2} + \frac{1}{(2\omega_s)^2} + \frac{1}{\omega_{FM}^2}\right] \quad (29)$$

When Expression (28) is substituted into Expression (29), Expression (30) can be obtained.

$$5 \cdot \omega_s^2 = \left[ \frac{\frac{1}{\frac{1}{\omega_{FM}^2} - \frac{31}{36 \cdot \omega_s^2}} \cdot (2\omega_s)^2}{2} \right] \cdot \left[ \frac{1}{\frac{1}{\frac{1}{\omega_{FM}^2} - \frac{31}{36 \cdot \omega_s^2}}} + \frac{1}{(2\omega_s)^2} + \frac{1}{\omega_{FM}^2} \right] \quad (30)$$

When Expression (30) is solved for ωFM, because the resonant frequency is positive, Expression (31) can be obtained.

$$\omega_{FM} = \sqrt{\frac{12}{5}} \cdot \omega_s \quad (31)$$

When Expression (31) is substituted into Expression (28) to find ωFF, because the resonant frequency is positive, Expression (32) can be obtained.

$$\omega_{FF} = \frac{3}{2} \cdot \omega_s \quad (32)$$

When Expression (32) is substituted into Expression (6) to find LF, Expression (33) can be obtained.

$$L_F = \frac{1}{9 \cdot \pi^2 \cdot C_F f_s^2} \quad (33)$$

When Expression (31) is substituted into Expression (8), Expression (34) can be obtained.

$$C_{MR} = \frac{5}{12 \cdot L_F \cdot \omega_s^2} \quad (34)$$

When Expression (33) is substituted into Expression (34) to find CMR, Expression (35) can be obtained.

$$C_{MR} = \frac{15 \cdot C_F}{16} \quad (35)$$

From Expressions (11), ωs can be expressed as Expression (36).

$$\omega_s = \frac{1}{2\sqrt{L_{MR} \cdot C_{MR}}} \quad (36)$$

When Expression (35) is substituted into Expression (36) to find LMR, Expression (37) can be obtained.

$$L_{MR} = \frac{1}{15 \cdot \pi^2 \cdot C_F \cdot f_s^2} \quad (37)$$

By defining the driving frequency fs and the first resonant capacitor 8 (CF) including the capacitance between the drain and source (collector and emitter) in the switch 11 through the above-described procedure, the third resonant capacitor 10 (CMR), first resonant coil 7 (LF), and third resonant coil 9 (LMR) can be determined.

Table 1 illustrates results of first determining the first resonant capacitor 8 (CF) including the capacitance between the drain and source (collector and emitter) in the switch 11 and then calculating the impedance between the drain and source (collector and emitter) by the above-described way. As for the switch 15, because of the push-pull inverter, substantially the same results different in that the first resonant coil 7 is replaced with the second resonant coil 13 and the first resonant capacitor 8 is replaced with the second resonant capacitor 14 are obtained. It is noted, however, that a resonance condition is that the second resonant frequency at which the input impedance Zin is the minimum is F2 and the first resonant frequency F1 and the third resonant frequency F3 at which the input impedance Zin is the maximum are 1 time and 3 times the driving frequency fs, respectively. In consideration of only the resonant inverter, the input impedance Zin and the drain-to-source impedance in each of the switches 11 and 15 are the same.

TABLE 1

Calculated Values In Resonant Coil And Resonant Capacitance
(Example Where CF Is Set At 440 pF)

| F2 | $L_F$ | $C_F$ | $L_{MR}$ | $C_{MR}$ |
|---|---|---|---|---|
| 1.25 fs | $L_F := \frac{25}{576 \cdot \pi^2 \cdot C_F \cdot f_s^2}$ | $C_F := 440 \cdot p$ | $L_{MR} := \frac{100}{1071 \cdot \pi^2 \cdot C_F \cdot f_s^2}$ | $C_{MR} := \frac{1071 \cdot C_F}{625}$ |
| 1.5 fs | $L_F := \frac{1}{16 \cdot \pi^2 \cdot C_F \cdot f_s^2}$ | $C_F := 440 \cdot p$ | $L_{MR} := \frac{1}{15 \cdot \pi^2 \cdot C_F \cdot f_s^2}$ | $C_{MR} := \frac{5 \cdot C_F}{3}$ |
| 1.75 fs | $L_F := \frac{49}{576 \cdot \pi^2 \cdot C_F \cdot f_s^2}$ | $C_F := 440 \cdot p$ | $L_{MR} := \frac{1}{16 \cdot \pi^2 \cdot C_F \cdot f_s^2}$ | $C_{MR} := \frac{64 \cdot C_F}{49}$ |
| 2 fs | $L_F := \frac{1}{9 \cdot \pi^2 \cdot C_F \cdot f_s^2}$ | $C_F := 440 \cdot p$ | $L_{MR} := \frac{1}{15 \cdot \pi^2 \cdot C_F \cdot f_s^2}$ | $C_{MR} := \frac{15 \cdot C_F}{16}$ |
| 2.25 fs | $L_F := \frac{9}{64 \cdot \pi^2 \cdot C_F \cdot f_s^2}$ | $C_F := 440 \cdot p$ | $L_{MR} := \frac{36}{455 \cdot \pi^2 \cdot C_F \cdot f_s^2}$ | $C_{MR} := \frac{455 \cdot C_F}{729}$ |

TABLE 1-continued

Calculated Values In Resonant Coil And Resonant Capacitance
(Example Where CF Is Set At 440 pF)

| F2 | $L_F$ | $C_F$ | $L_{MR}$ | $C_{MR}$ |
|---|---|---|---|---|
| 2.5 fs | $L_F := \dfrac{25}{144 \cdot \pi^2 \cdot C_F \cdot f_s^2}$ | $C_F := 440 \cdot p$ | $L_{MR} := \dfrac{25}{231 \cdot \pi^2 \cdot C_F \cdot f_s^2}$ | $C_{MR} := \dfrac{231 \cdot C_F}{625}$ |
| 2.75 fs | $L_F := \dfrac{121}{576 \cdot \pi^2 \cdot C_F \cdot f_s^2}$ | $C_F := 440 \cdot p$ | $L_{MR} := \dfrac{484}{2415 \cdot \pi^2 \cdot C_F \cdot f_s^2}$ | $C_{MR} := \dfrac{2415 \cdot C_F}{14641}$ |

Figure 5:
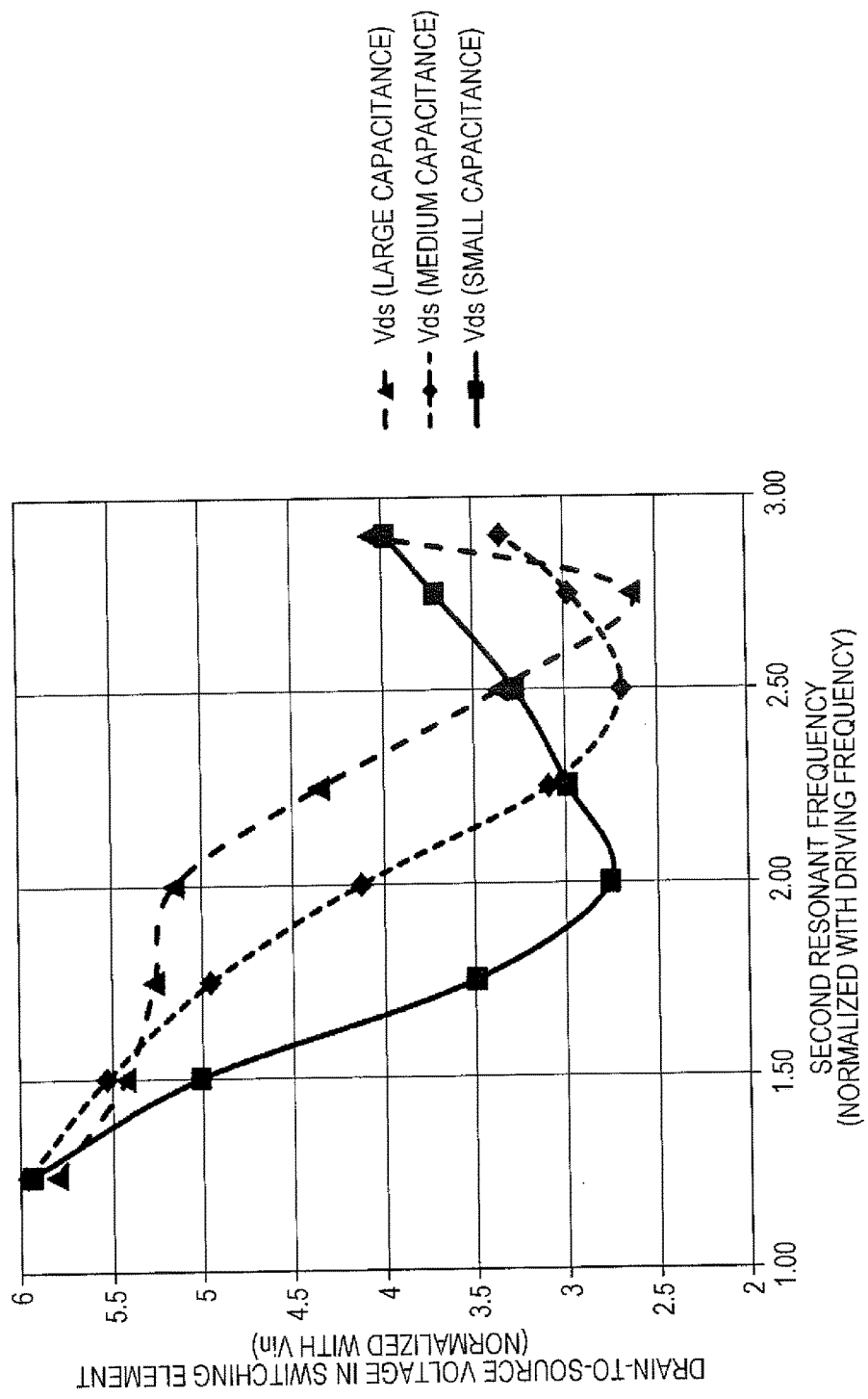
FIG. 5 illustrates a second resonant frequency and a drain-to-source voltage in a switch in the resonant inverter according to the present invention.

FIG. 5 illustrates a relationship between the drain-to-source voltage in the above-described switches 11 and 15 and the second resonant frequency F2. The horizontal axis indicates the second resonant frequency F2 when the driving frequency fs is 1.00. The vertical axis indicates the drain-to-source voltage in each of the switches 11 and 15. The solid line with square points indicates the drain-to-source voltage in the switch when the capacitance in the third resonant capacitor is small, the short-dashed line with diamond points indicates that when the capacitance in the third resonant capacitor is medium, and the long-dashed line with triangular points indicates that when the capacitance in the third resonant capacitor is large.

FIG. 5 reveals the following. The drain-to-source voltage in each of the switches 11 and 15 when the second resonant frequency F2 is a value smaller than twice the driving frequency fs (less than 2.00 in the horizontal axis) is always higher than that when the second resonant frequency F2 is twice the driving frequency fs. The drain-to-source voltage in each of the switches 11 and 15 when the second resonant frequency F2 is a value larger than twice the driving frequency fs (more than 2.00 in the horizontal axis) is lower in a specific range than that when the second resonant frequency F2 is twice the driving frequency fs. A way to reduce the operating voltage between the drain and source in the switch for any capacitance of the third resonant capacitor deduced from FIG. 5 is described below. When the second resonant frequency F2 at which Zin is the minimum is set at a value larger than twice and smaller than or equal to 2.75 times the driving frequency fs, the drain-to-source voltage is lower than that when the second resonant frequency F2 is set at a value twice the driving frequency fs. Accordingly, the operating voltage in the switching element can be reduced. This is written as an expression of 2fs<F2≤2.75fs. It is also revealed that, to simplify adjustment, for example, to reduce the drain-to-source voltage in the switch to three times or less than the input voltage, when the first and second resonant capacitors CF are set at a medium capacitance and the second resonant frequency F2 defined by the third resonant coil and third resonant capacitor is set at 2.5fs, the second resonant frequency F2 can vary within a range of 2.25fs to 2.75fs.

In comparison with known resonant inverters, the above-described resonant inverter can have a reduced number of components constituting the resonant circuits. Accordingly, the resonant inverter capable of reducing its size and cost can be provided. Because the drain-to-source impedance in each of the switches 11 and 15 can be easily calculated by determining the first and second resonant capacitances CF including the drain-to-source capacitances in the switches 11 and 15 and performing the proposed method, a drain-to-source voltage lower than that when F2=2fs is set is obtained by setting the second resonant frequency F2 at which the impedance is the minimum at a value within an allowable range of variations. This can result in achieving the reliable resonant inverter having little adverse effect on the life of the switches.

Second Embodiment

Figure 2:
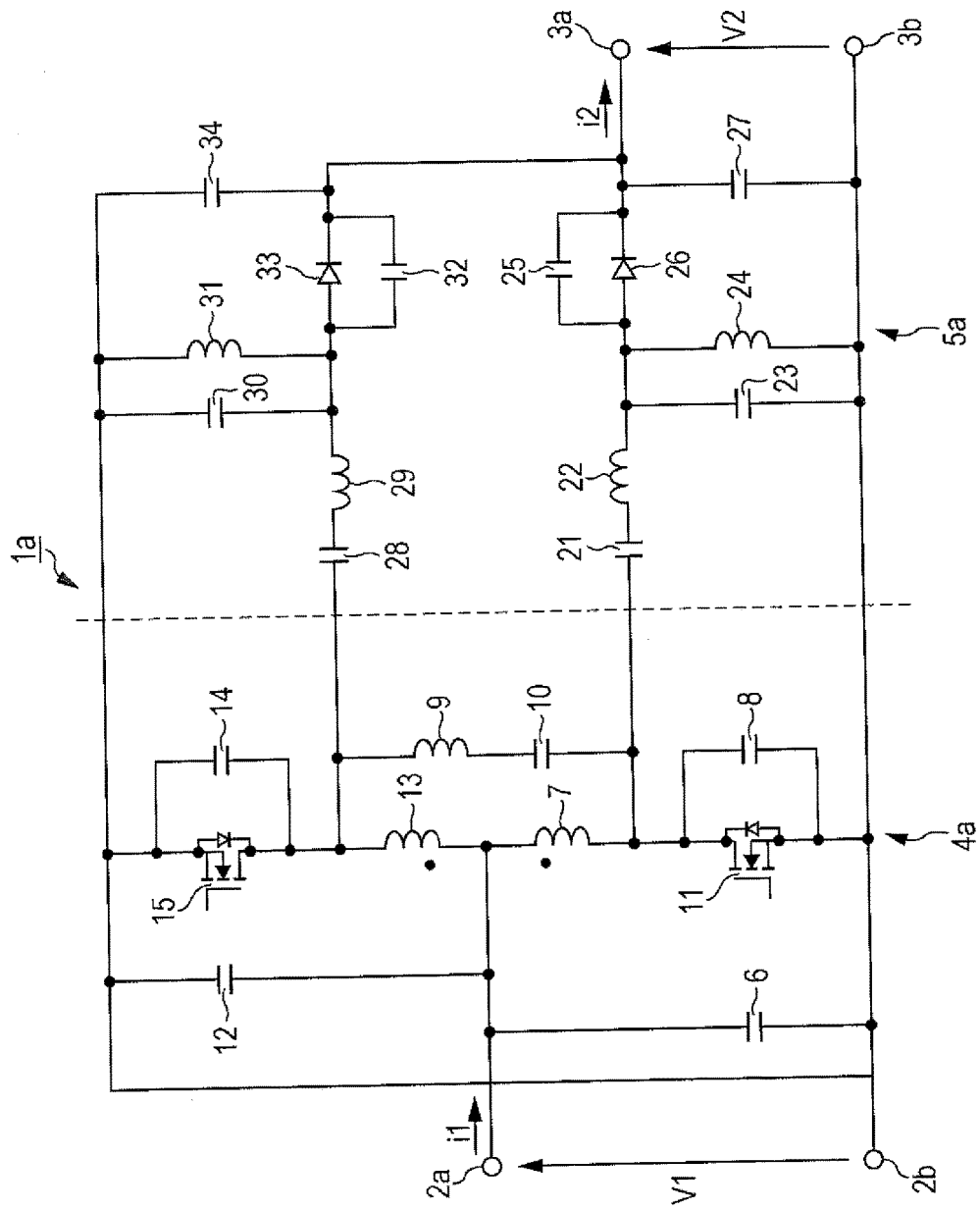
FIG. 2 illustrates a resonant inverter circuit in which first coils in the inverter sections in the configuration in the first embodiment are configured as a single device and a midpoint is disposed according to a second embodiment of the present invention.

FIG. 2 illustrates a resonant inverter circuit according to a second embodiment of the present invention. The second embodiment differs from the first embodiment in that the first resonant coil 7 and second resonant coil 13 illustrated in the first embodiment are configured as a single device and its midpoint is connected to the input terminal 2a. The other configuration is common to the first embodiment. Because the first and second resonant coils are configured as the single device, the number of mounted components can be reduced and variations in inductance in the coils can be reduced. The third resonant coil and third capacitor are shared by the sections, and thus the resonant inverter having variations smaller than that in the resonant inverter illustrated in the first embodiment can be achieved. In the second embodiment, the number of mounted resonant elements can be five.

Third Embodiment

Figure 3:
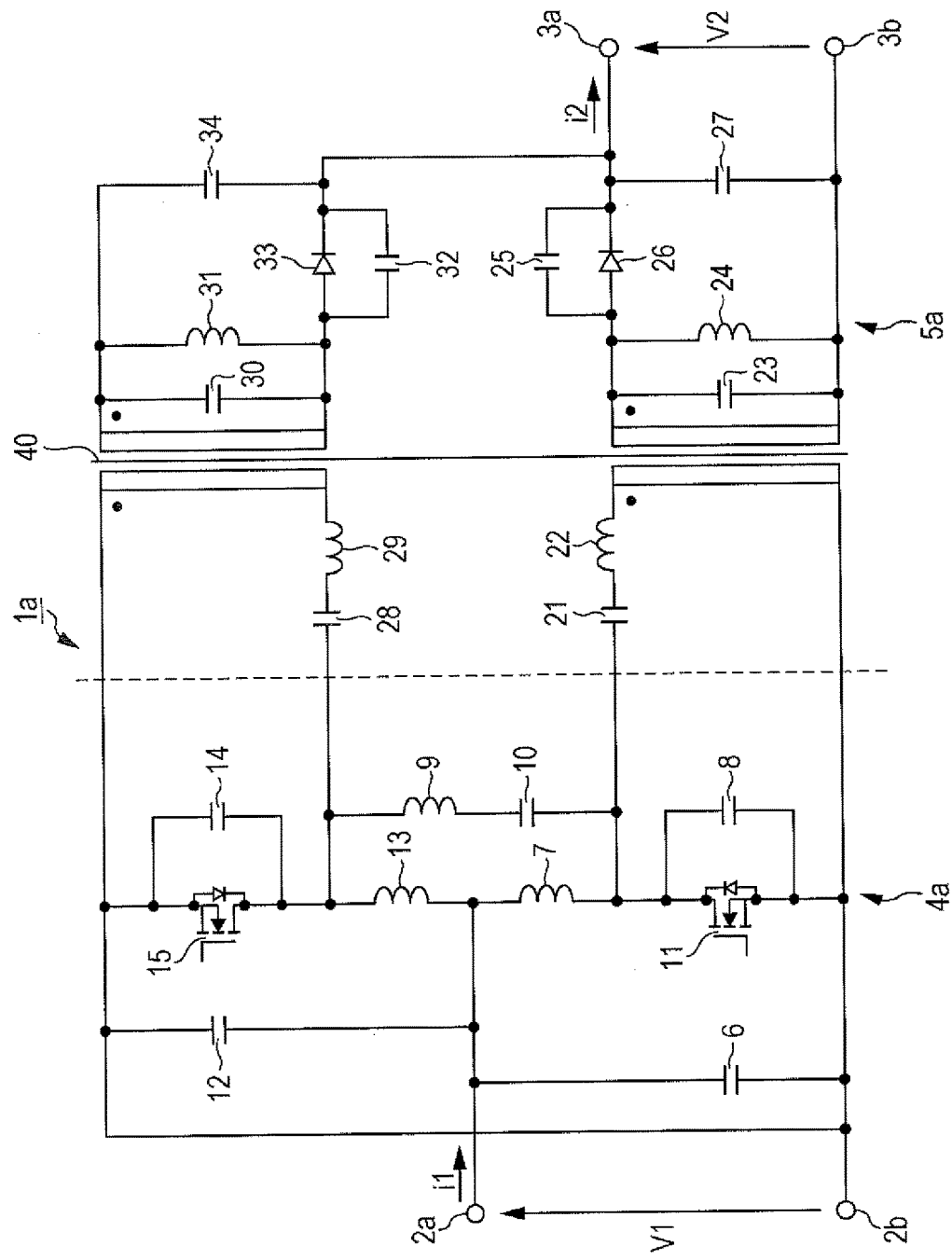
FIG. 3 illustrates a resonant inverter circuit in which an isolation transformer is added in the configuration in the first embodiment according to a third embodiment of the present invention.

FIG. 3 illustrates a resonant inverter circuit according to a third embodiment of the present invention. The third embodiment differs from the first embodiment in that it is an embodiment of an isolated inverter and an isolation transformer 40 is added in the resonant rectifier 5a. The other configuration is common to the first embodiment. The isolated resonant inverter can be achieved in a similar way to the non-isolated resonant inverter.

Fourth Embodiment

Figure 4:
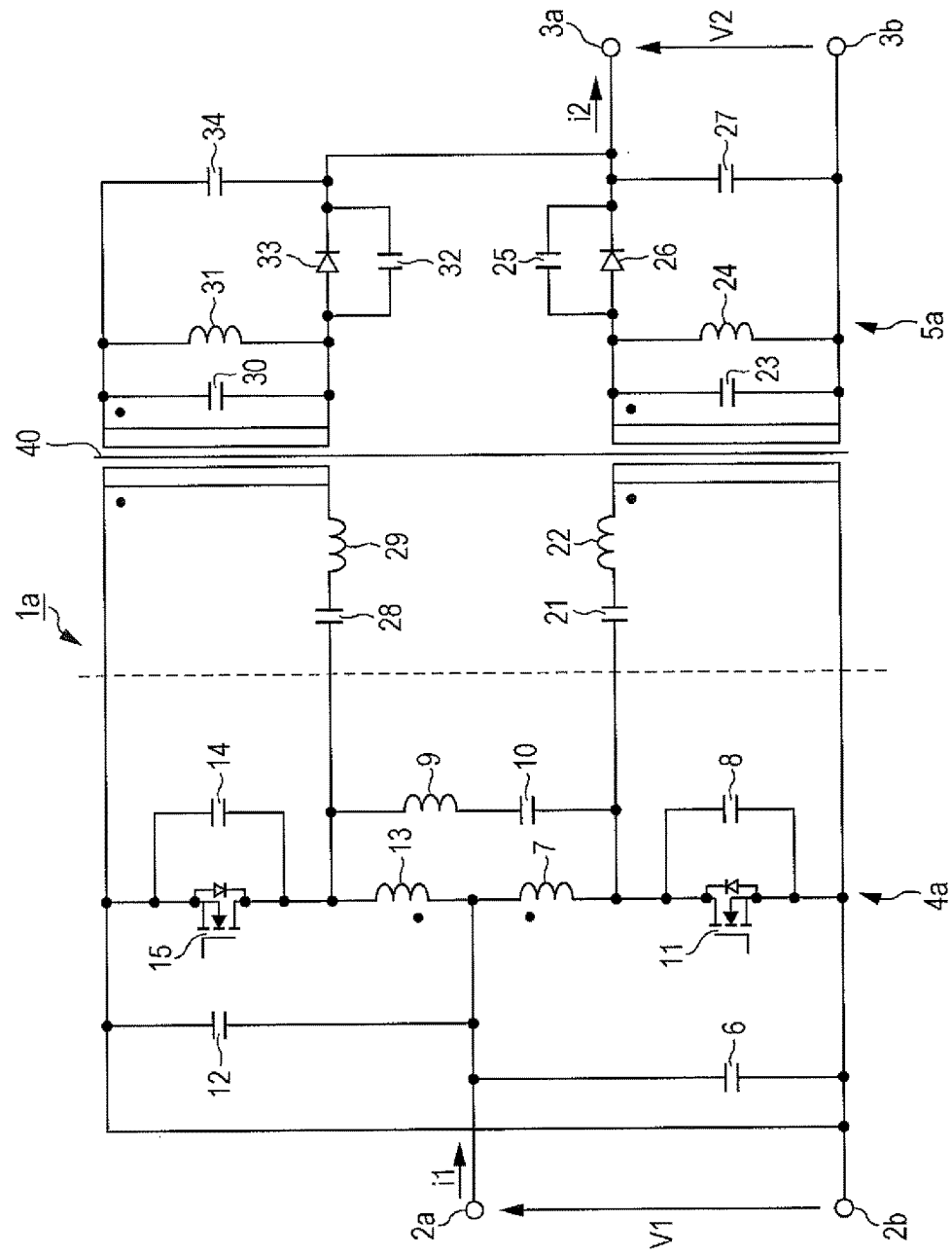
FIG. 4 illustrates a resonant inverter circuit in which first coils in the inverter sections in the configuration in the third embodiment are configured as a single device and a midpoint is disposed according to a fourth embodiment of the present invention.

FIG. 4 illustrates a resonant inverter circuit according to a fourth embodiment of the present invention. The fourth embodiment differs from the third embodiment in that the first resonant coil 7 and second resonant coil 13 illustrated in the third embodiment are configured as a single device and its midpoint is connected to the input terminal 2a. The other configuration is common to the third embodiment. The resonant inverter can be achieved in a similar way to that in the third embodiment, and the resonant inverter that can have a reduced number of mounted resonant elements and contribute to reduction in the size and cost can be provided.

The resonant inverters and resonance power supply apparatuses according to the embodiments of the present invention are described above. The present invention is not limited to the description on the above-described embodiments, and various modifications can be made.

For example, the switch 11 and switch 15, which are described above as field effect transistors (FETs), may be any other types of switch, such as bipolar transistors.

For example, the resonant inverters, which are described above as the step-down type, may be step-up resonant inverters.

The proposed resonant inverters can support electric power twice that in a single-ended inverter, and the driving circuit can also support high frequencies. The driving frequency is expected to support high frequencies up to several hundred MHz. The use of next-generation semiconductor gallium nitride (GaN) or silicon carbide (SiC) can enable significant size reduction and efficiency improvement.

What is claimed is:

1. A resonant inverter comprising:
   first and second switches that are alternately turned on and off; and
   first and second capacitive elements connected in parallel to the first switch and the second switch, respectively;
   a first coil disposed between the first switch and an input voltage terminal;
   a second coil disposed between the second switch and the input voltage terminal; and
   a third coil and a third capacitive element connected in series to each other and connected in parallel to a series circuit of the first and second coils,
   wherein the first and second capacitive elements and the first and second coils constitute a plurality of first resonant circuits, the third coil and the third capacitive element constitute a single second resonant circuit, and the first coil is directly connected to the third capacitive element.

2. The resonant inverter according to claim 1, wherein the second resonant circuit has a resonant frequency larger than twice and smaller than or equal to 2.75 times a driving frequency at which the first and second switches are driven.

3. A resonance power supply apparatus comprising the resonant inverter according to claim 1 and a resonant rectifier connected to the resonant inverter.

4. A resonance power supply apparatus comprising the resonant inverter according to claim 2 and a resonant rectifier connected to the resonant inverter.

* * * * *